US 9,815,493 B2

(12) United States Patent
Bean et al.

(10) Patent No.: US 9,815,493 B2
(45) Date of Patent: Nov. 14, 2017

(54) ELECTRIC POWER ASSISTED STEERING SYSTEMS

(71) Applicant: Jaguar Land Rover Limited, Whitley Coventry, Warwickshire (GB)

(72) Inventors: Alex Bean, Coventry (GB); Paolo Pucci, Leamington Spa (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/354,586

(22) PCT Filed: Oct. 29, 2012

(86) PCT No.: PCT/EP2012/071417
§ 371 (c)(1),
(2) Date: Apr. 27, 2014

(87) PCT Pub. No.: WO2013/060898
PCT Pub. Date: May 2, 2013

(65) Prior Publication Data
US 2014/0277944 A1 Sep. 18, 2014

(30) Foreign Application Priority Data
Oct. 27, 2011 (GB) .................................. 1118619.4

(51) Int. Cl.
*B62D 15/02* (2006.01)
*B62D 6/10* (2006.01)
(Continued)

(52) U.S. Cl.
CPC ............. *B62D 6/10* (2013.01); *B62D 5/0463* (2013.01); *B62D 6/002* (2013.01); *B62D 6/008* (2013.01);
(Continued)

(58) Field of Classification Search
CPC .... B62D 15/00; B62D 15/02; B62D 15/0215; B62D 15/0235
(Continued)

(56) References Cited

U.S. PATENT DOCUMENTS 6,131,693 A * 10/2000 Mukai et al. ................. 180/446
6,597,141 B1    7/2003 Wilson-Jones et al.
(Continued)

FOREIGN PATENT DOCUMENTS

DE    10200405921 A1    5/2006
DE    102010033494 A1    2/2012
(Continued)

OTHER PUBLICATIONS

Machine Translation of Ullman et al. DE 102010003494 retrieved from espacenet.*
(Continued)

*Primary Examiner* — Thomas Ingram
(74) *Attorney, Agent, or Firm* — Reising Ethington P.C.

(57) ABSTRACT

A vehicle comprising an electric power assist steering (EPAS) system, wherein the EPAS system is configured to receive a detected value of steering wheel angle and/or steering wheel angular velocity and wherein the EPAS system is configured to improve the accuracy of the detected value of steering wheel angle and/or steering wheel angular velocity by compensating for any one or more of an angular phasing of the joint between any two linked components of the steering mechanism and the effect on steering wheel angle of the deflection across a torque sensor at least substantially due to the stiffness of that torque sensor.

12 Claims, 4 Drawing Sheets

(51) Int. Cl.
*B62D 6/00* (2006.01)
*B62D 5/04* (2006.01)

(52) U.S. Cl.
CPC .......... *B62D 15/02* (2013.01); *B62D 15/021* (2013.01); *B62D 15/0215* (2013.01); *B62D 15/0235* (2013.01)

(58) Field of Classification Search
USPC .............................................. 701/41, 42, 43
See application file for complete search history.

(56) References Cited

U.S. PATENT DOCUMENTS

| | | | |
|---|---|---|---|
| 2004/0140148 A1* | 7/2004 | Nishizaki et al. | 180/443 |
| 2004/0188172 A1* | 9/2004 | Asada | 180/446 |
| 2007/0162206 A1* | 7/2007 | Tamaizumi | 701/41 |
| 2008/0027609 A1* | 1/2008 | Aoki | B62D 5/0463 701/43 |
| 2008/0033613 A1* | 2/2008 | Tamaizumi et al. | 701/41 |
| 2009/0192665 A1 | 7/2009 | Nozawa | |
| 2009/0271069 A1* | 10/2009 | Yamamoto et al. | 701/41 |
| 2010/0017064 A1* | 1/2010 | Kojima | 701/42 |
| 2010/0094507 A1* | 4/2010 | Mitsuhara | B62D 15/0215 701/42 |
| 2012/0173081 A1* | 7/2012 | Hsu et al. | 701/42 |
| 2012/0185219 A1* | 7/2012 | Tomaru et al. | 703/1 |

FOREIGN PATENT DOCUMENTS

| | | |
|---|---|---|
| EP | 1304275 A1 | 4/2003 |
| JP | 2007008299 A | 1/2007 |

OTHER PUBLICATIONS

International Search Report for application No. PCT/US2012/071417 dated Mar. 21, 2013, 6 pages.
UK Search Report for corresponding application No. GB 1219434.6, Feb. 20, 2013, 1 page.

* cited by examiner

ELECTRIC POWER ASSISTED STEERING SYSTEMS

TECHNICAL FIELD

The present invention relates to a vehicle having an Electric Power Assisted Steering (EPAS or EPS) system and to an improvement in EPAS systems. More particularly, but not exclusively, the invention relates to an EPAS system configured to compensate for errors or inaccuracies of known EPAS systems. Aspects of the invention relate to an EPAS system, to a program, to a vehicle and to a method.

BACKGROUND ART

Electric Power Assisted Steering (EPAS or EPS) systems employ an electric motor to assist the driver in providing the amount of torque required to control the direction of the steered wheels of a vehicle for controlling the direction of the vehicle. Sensors disposed within the vehicle are used to detect the motion and torque of the steering wheel. A computer module calculates an amount of assistive torque to apply and instructs an electric motor, optionally, disposed on a rack between the steered wheels of the vehicle, (i.e. the wheels that are being moved) to apply that assistive torque. The steering system allows varying amounts of assistance to be applied depending upon the driving conditions. For example, if the vehicle is travelling forwards (typically the steered wheels are leading); or if the vehicle is travelling in a reverse direction (typically the steered wheels are trailing); or if the vehicle is cornering, the amount of assistive torque applied might need to be different. Similarly, dependent upon the speed of travel, a different amount of assistive torque may be needed. Typically, greater assistance is needed at slower speeds, but at higher speeds a lower amount of assistive torque may be appropriate, otherwise the driver might find the vehicle difficult to handle. For a particular restricted set of pre-determined conditions the assistive torque to be applied is found in a look up table or is calculated.

It is desirable in certain applications to carefully control the driving experience and for the handling of the vehicle experienced by the driver to meet very high standards. In executive or luxury cars it is desirable to provide a smooth driving feel with a high sense of driver control. In vehicle models of a more sporting nature, a different feel of vehicle handling may be desired. It may even be desirable to provide both characteristics within the same vehicle and allow the driver to select between driving modes. It is an object of the present invention to provide an improved EPAS system. The present invention seeks to improve upon the EPAS systems of the prior art by providing an EPAS system that may compensate for or otherwise mitigate some undesirable characteristics of known EPAS systems.

SUMMARY

According to one aspect of the invention, there is provided a vehicle comprising an electric power assist steering (EPAS) system, wherein the EPAS system is configured to receive a detected value of steering wheel angle and/or steering wheel angular velocity and wherein the EPAS system is configured to improve the accuracy of the detected value of steering wheel angle and/or steering wheel angular velocity by compensating for any one or more of:
  (i) an angular phasing of the joint between any two linked components of the steering mechanism by carrying out a computation which accounts for an angle at a joint between the two linked components; and
  (ii) the effect on steering wheel angle of the deflection across a torque sensor at least substantially due to the low-stiffness of that torque sensor.

Optionally, the EPAS system may be configured to use the improved value of steering wheel angle and/or steering wheel angular velocity to compute the amount of assistive torque supplied by a motor of the EPAS system.

A sensor for detecting the angle of rotation of the steering wheel may be disposed within the steering mechanism and may not be directly connected to the steering wheel.

The EPAS system may be configured to compensate for the effect of angle phasing, of the joint between two linked components of the steering mechanism using any one or more of the following relationships:

$$\frac{\dot{\beta}_5}{\dot{\alpha}_5} = \frac{\omega_b}{\omega_a} = \frac{\cos\delta_5}{1 - \sin^2\delta_5\cos^2\alpha_5};$$

$$\beta_5 = \arctan2(\sin\alpha_5, \cos\alpha_5 \cdot \cos\delta_5); \text{ and}$$

$$\alpha_5 = \arctan2\left(\sin\beta_5, \frac{\cos\beta_5}{\cos\delta_5}\right)$$

wherein the two linked components are disposed at an angle $\delta_5$ relative to one another, wherein the angle of rotation at the input is $\alpha_5$ and the angle of rotation at the output is $\beta_5$ and wherein $\omega_a$ and $\omega_b$ are the angular velocities (in rad/s) of the two linked components having angles of rotation of $\alpha_5$ and $\beta_5$ respectively. The linked components may be shafts that are rotated to translate the rotational movement imparted to the steering wheel to the driving wheels.

Additionally or alternatively, the EPAS system may be configured to compensate for the effect of an angle phasing of the joint between two linked components of the steering mechanism using a computation that includes an approximation and/or equivalent function or value for any one or more of:
  (i) the cosine and/or sine of the angle between the two linked components ($\cos \delta_5$ and/or $\sin \delta_5$);
  (ii) the square of the cosine of the angle input to the joint ($\cos^2 \alpha_5$);
  (iii) the square of the sine of the angle between the two linked components ($\sin^2 \delta_5$);
  (iv) the cosine and/or sine of the angle input to the joint ($\cos \alpha_5$ and/or $\sin \alpha_5$);
  (v) the arctangent in the range of $-\pi/2$ and $\pi/2$ of the sine of the angle input to the joint and of the cosine of the angle between the two linked components multiplied by the cosine of the angle input to the joint; and
  (vi) the arctangent in the range of $-\pi/2$ and $\pi/2$ of the sine of the angle output from the joint ($\sin \beta_5$) and of the quotient of the cosine of the angle output from the joint and the cosine of the angle between the two linked components ($\cos \beta_5/\cos \delta_5$).

Optionally, the computation that includes an approximation and/or equivalent function or value may use a Taylor Series expansion or a Euler Series Expansion and/or may reference an approximate or equivalent value from a look-up table.

The EPAS system may be configured to compensate for the effect of angle phasing of a joint between two linked components of the steering mechanism to improve the accuracy of the detected steering wheel angle ($\alpha$) and/or the steering angle velocity by conducting a computation in which reference is made to one or more look-up tables to locate one or more stored values approximating said relationships between the detected variable and/or the angle(s) of the joint between the two linked components.

Additionally or alternatively, the EPAS system may be configured to compensate for the effect of the deflection across the steering wheel torque sensor by determining a displacement angle and off-setting the detected steering wheel angle by a factor substantially proportional to that displacement angle.

Additionally or alternatively, the EPAS system may be configured to compensate for the effect of the deflection across the steering wheel torque sensor by determining a displacement angle and subtracting that displacement angle from the detected steering wheel angle.

Optionally, the EPAS system may be configured to receive a detected value of steering wheel torque and may be configured to improve the accuracy of the detected value of steering wheel torque by compensating for an angular phasing of the joint between any two linked components of the steering mechanism.

The EPAS system may be configured to use at least an approximation of a torque contribution (Tweight) to the steering wheel torque caused by the presence of one or more weights disposed in the steering wheel in an off-centre position to compensate for that torque contribution (Tweight) by computing a corrected value of steering wheel torque from a detected value of steering wheel torque and/or to compensate for that torque contribution (Tweight) by computing a corrected value of assistive motor torque.

According to another aspect of the invention, there is provided a method of assisting the steering of a vehicle, the method comprising:
(a) providing an electric power assist steering (EPAS) system having a controller configured to adjust a detected variable value used by the controller of the EPAS system;
(b) receiving a detected variable value of steering wheel angle or steering wheel angular velocity;
(c) adjusting the detected value of steering wheel angle or steering wheel angular velocity by compensating for any one or more of:
  (i) a phasing of angle caused by a joint between any two linked components of a steering mechanism and/or drive mechanism by carrying out a computation that accounts for an angle at a joint ($\delta_5$) between the two linked components; and
  (ii) the effect on steering wheel angle of the deflection across a torque sensor at least substantially due to the low-stiffness of that torque sensor; and
(d) using the adjusted value of steering wheel angle and/or steering wheel angular velocity in computations to calculate the amount of assistive torque to be supplied by a motor of the EPAS system.

According to a further aspect of the invention, there is provided a program for a computer for use in an EPAS system of a vehicle, the program containing one or more algorithms for carrying out the method of the preceding paragraph such that when running, the program is configured to compensate for an inaccuracy in the detected steering wheel angle and/or steering wheel angular velocity, the program configured to receive a detected value of steering wheel angle and/or steering wheel angular velocity and configured to adjust the detected value to compensate for any one or more of:
  (i) an angle phasing of a joint between any two linked components of the steering mechanism and/or drive mechanism by carrying out a computation that accounts for an angle at a joint ($\delta_5$) between the two linked components; and
  (ii) the effect on steering wheel angle of the deflection across a torque sensor (20) at least substantially due to the low-stiffness of that torque sensor.

Within the disclosure of this application it is envisaged that all of the various aspects, embodiments, examples, features and alternatives set out in the preceding paragraphs and/or in the following description and drawings may be taken independently or in any suitable combination thereof. For example, features described in connection with one embodiment are applicable to all embodiments unless there is incompatibility of features.

BRIEF DESCRIPTION OF THE DRAWINGS

Embodiments of the invention will now be described, by way of example only, with reference to the accompanying drawings, in which.

Figure 1:
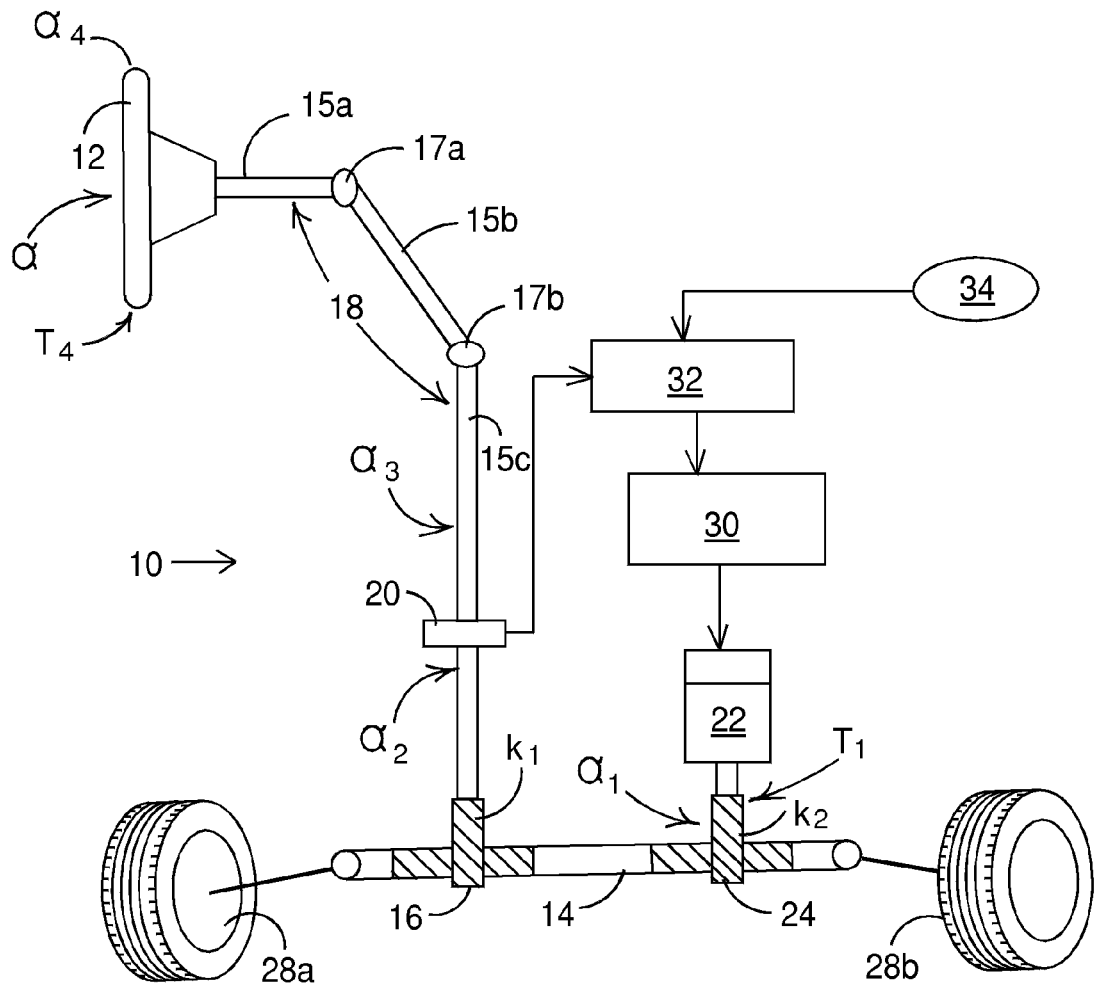
FIG. 1. is a schematic illustration of a vehicle and EPAS system.

The following table 1.1 lists the reference symbols used in the drawings along with a brief description of the feature that they reference.

| REFERENCE SYMBOL | BRIEF DESCRIPTION | REFERENCE SYMBOL | BRIEF DESCRIPTION |
|---|---|---|---|
| 10 | EPAS system | $B_1$ | Angle of first offset mass |
| 12 | Steering wheel | $R_1$ | Radial position of first offset mass |
| 14 | Rack bar | $T_4$ | Driver applied torque at the steering wheel |
| 15a, 15b, 15c | Shafts | $\alpha_3$ | Shaft angle at the torque sensor |

-continued

| REFERENCE SYMBOL | BRIEF DESCRIPTION | REFERENCE SYMBOL | BRIEF DESCRIPTION |
|---|---|---|---|
| 16 | Steering gear | $\alpha_2$ | Shaft angle at the rack |
| 17a, 17b | Joints | $\alpha_1$ | Motor angle |
| 18 | Collectively, the shafts and joints connecting the steering wheel to the steering gear | $T_1$ | Motor torque |
| 20 | Torque sensor | R | Distance of weight in steering wheel from the centre of the steering wheel |
| 22 | Electric motor | $K_1, k_2$ | Gears |
| 24 | Connection between the electric motor and the rack | $\alpha_4$ | Actual angle of rotation of steering wheel |
| 28a, 28b | Wheels (road wheels) | $\alpha_4$ | Angle of rotation of the steering wheel measured at the steering wheel |
| 30 | Motor controller | $A_5$ | Input angle at joint |
| 32 | EPAS controller unit | $B_5$ | Output angle at joint |
| 34 | Sensor inputs | $\delta_5$ | Angle between two jointed shafts |
| 44 | Off-set mass | $\Delta\alpha$ | Angle displacement through the torque sensor |
| 46 | Steering wheel centre | T | Torque as measured by the torque sensor |
| $\omega_a$ | Angular velocity at input of joint | $B_2$ | Angle of second offset mass |
| $W_1$ | First offset mass | $R_2$ | Radial position of Second offset mass |
| $\delta$ | Angle of steering wheel relative to horizontal notional plan | $W_2$ | Second offset mass |

DETAILED DESCRIPTION

Detailed descriptions of specific embodiments of the EPAS system, control units therefor and vehicles employing the same are disclosed herein. It will be understood that the disclosed embodiments are merely examples of the way in which certain aspects of the disclosure can be implemented and do not represent an exhaustive list of all of the ways the disclosure may be embodied. Indeed, it will be understood that the EPAS system, control units therefor and vehicles employing the same as described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the disclosure.

In the specification reference is made to the term "torque" (also known as moment or moment of force), unless otherwise stated, this is to be taken to have its normal meaning being a turning force. The S.I. unit of measurement of torque is Nm and in the specification Nm are typically used.

Referring to FIG. 1 there is shown a schematic illustration of a vehicle comprising an EPAS system 10 wherein a steering mechanism comprises a steering wheel 12 coupled to a rack bar (also referred to simply as rack) 14 through gearing 16 (typically a pinion gear) and a combination of linked components comprising two or more linked components, for example, shafts 15a, 15b, 15c that are coupled to one another by joints 17a, 17b respectively (labelled collectively as 18). Road wheels 28a, 28b which can be used to control the vehicle direction are coupled to each end of the rack bar 14. A torque sensor 20 is positioned between the steering wheel 12 and rack 14. Typically, the torque sensor 20 includes a low-stiffness torsion bar and is used to measure the torque applied by the driver to the steering wheel 12 (referred to as the "measured steering wheel torque" or "detected steering wheel torque" or "driver torque"). This allows the in-line measurement of torque to be made. In alternative embodiments a reaction torque sensor may be employed. The power assistance is provided by an electric motor 22 that is coupled to the rack bar 14 by means of gearing 24. In other envisaged embodiments a belt may be employed to couple the electric motor 22 to the rack bar 14. The electric motor 22 is coupled to and controlled by a motor controller unit 30 (such as a computer or central processing unit). Optionally, the motor controller unit 30 is coupled to an EPAS controller 32 (which may take the form of a programmable, processing unit).

Figure 4:
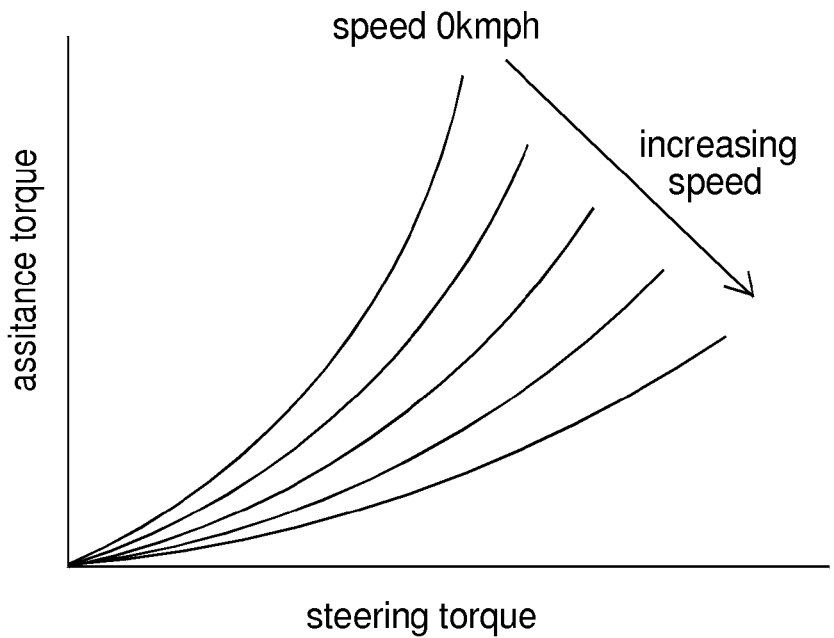
FIG. 4. is an example of a tuning map of the assistive torque that an electric motor typically applies for a given vehicle speed and detected driver torque.

The torque sensor 20 and other input sensors (collectively labelled as 34) are coupled to the EPAS controller unit 32. This is depicted schematically in FIG. 1. Information detected by the input sensors 34, for example, vehicle speed, temperature and steering angle is monitored by the EPAS controller unit 32. The EPAS system 10 typically requires at least one measurement of the current or actual steering wheel angle $\alpha$. The steering wheel angle $\alpha$ can be measured at one or more different positions within the steering system. A steering wheel angle measurement $\alpha_4$ made directly at the steering wheel 12 is not typically made, but rather a steering wheel angle measurement is carried out at one or more locations distant from the steering wheel 12 using sensors, which may for example, be located at the positions indicated by $\alpha_1$, $\alpha_2$, and $\alpha_3$ as shown in FIG. 1. The data detected by the torque sensor 20 is also monitored by the EPAS controller unit 32, as such the EPAS controller unit 32 is provided with a determined or detected value of the steering wheel torque T, that is at least proportional to the torque $T_4$ applied by the driver. Based upon received data and/or pre-programmed algorithms and/or look-up tables, the EPAS controller 32 computes an assistance torque $T_1$. In FIG. 4 an illustration of a look-up map is shown, wherein for a given determined or measured driver demand $T_4$ or steering wheel torque $T_4$ at a particular vehicle speed, a value of assistance torque $T_1$ is provided. This information is conveyed to and translated by the motor controller unit 30 into a current or live torque demand $T_1$ for the electric motor 22. The electric motor 22 is thereby configured to provide the required assistance torque $T_1$ to the rack 14 to turn i.e. steer the wheels 28a, 28b.

In a typical open loop EPAS controller, a required assistance torque is generated by the EPAS controller 32, which collates the data received from the input sensors 34, and then passes the inputs through a combination of filters and algorithms, whose characteristics are tuned to determine steering characteristics of the vehicle (for example, as per FIG. 4). The steering characteristics of the vehicle may be changed by the driver of the vehicle, depending upon the type of driving and driving conditions.

Alternatively, in closed loop EPAS systems, the EPAS controller 32 unit calculates a desired reference driver torque. This desired reference torque (also referred to as referenced driver torque) is based upon the real-time data inputs from sensors and/or pre-programmed algorithms and/or look-up data available in tables. The electric motor 22 is controlled to apply a corresponding assistive torque $T_1$ such that the actual driver torque $T_4$ is matched to the reference torque (τref) at least as closely as possible. In this way the torque $T_4$ required by the driver to control the vehicle is itself controlled by the EPAS system 10 so that the driving experience and handling of the vehicle as perceived by the driver is controlled.

One advantage of the present invention provides an improved EPAS system 10 in which inaccuracies or "error states" that are present in known EPAS systems 10 (for both open and closed loop controllers) are compensated for.

The EPAS system 10 herein described is capable of receiving a detected variable value or deriving a variable value from a detected variable value. The new EPAS system 10 is configured to improve the accuracy of the detected and/or derived variable value to at least partially eliminate any discrepancy between the actual variable value and the detected or derived variable value. The EPAS system 10 is configured to control the amount of assistive torque $T_1$ supplied by an electric motor 22 of the EPAS system 10 based upon, (among other factors) the improved variable value.

A source of deviation between the detected or derived variable arises because of the physical geometry of the joints 17a, 17b and shafts 15a, 15b, 15c that may be present in typical EPAS systems 10. Where two components are linked by a joint and at an angle, then a rotation of the steering wheel 12 may not be accurately translated by those components. A measurement of steering wheel angle (α) taken downstream of components linked at an angle (such as shafts 15a, 15b) may incorporate an error. The geometry is such that a variation in the angle through which the steering wheel has been turned or rotated a does not necessarily correspond to an equal variation in the angle of the output shaft $\alpha_3$ (see FIG. 1). This is considered to be because each joint 17a, 17b introduces a different phasing between the angle at its input shaft (a for example—see FIG. 1) and the angle at its output shaft ($\alpha_3$ for example—see FIG. 1) due to the angle between the linked components (which is non-zero or not 180°), stiffness, friction, stiction, free-play and possibly other factors as well. The amount of phase-shifting introduced is dependent upon the speed of rotation of the shafts 15a, 15b and the angle of the joints 17a, 17b (i.e. the angle between the shafts 15a, 15b)

A further possible source of deviation between the detected or derived variable arises from the fact that steering wheels 12 typically comprise features 44 such as air bags, control devices and safety features (as examples), as such the weight of the steering wheel (and for these and other reasons also the steering column) may not be uniformly distributed around its centre of rotation and this can generate an undesired fluctuating torque. In other words, the steering wheel system behaves as if there was an off-centre mass, offset from the axis of rotation and this offset mass can generate an undesired and fluctuating torque that is referred to herein as torque contribution (Tweight). The value of torque contribution (Tweight) is dependent on the actual or true angle α of the steering wheel 12.

One of the impacts of the additional and fluctuating torque attributable to the offset weight or uneven weight distribution of the steering wheel 12 on the input side of an EPAS system 10, is that the torque contribution (Tweight) effects the measured torque signal T. This is because the torque sensor 20 cannot distinguish between the component of the measured or sensed torque that is attributable to the weight imbalance in the steering wheel 12 (torque contribution (Tweight) and the genuine torque $T_4$ applied by the driver. For example, if the driver is applying a constant torque $T_4$, and the steering wheel 12 is rotating at a constant speed, the torque T actually measured by the sensor 20 is not constant, but rather contains a fluctuation that is dependent upon the steering wheel angle (α). This in turn has an impact (for example causes non-linearity) on the steering feel.

Another impact of the offset mass 44 appears on the output side of an EPAS system 10. The torque contribution (Tweight) is a torque that the electric motor 22 needs to "fight" against. For example, if the electric motor 22 is providing a constant torque, this does not translate into a linear motion (constant angular velocity) of the steering wheel, because when the offset weight 44 is "lifted", the steering wheel velocity will drop, and likewise, when the weight is "falling" the steering wheel velocity will increase (due to the extra momentum of the weight). This is a source of non-linearity in the steering feel of current EPAS systems, which the present invention seeks to at least mitigate against if not entirely remove.

The present invention seeks to mitigate certain undesirable effects of these and other factors or "error states". In the following embodiments it is described how the unbalanced weight of the column and steering wheel and non-linear joint geometry may be compensated for or entirely mitigated. Other components of the steering system, such as the torque sensor 20 itself are considered to be responsible for certain other inaccuracies and ways of mitigating these inaccuracies are also included within optional aspects of the invention.

Beneficial aspects of the described invention are summarised in the following list:

(1) one described embodiment provides a way of compensating for the effect of (non-linear) joint geometry on steering wheel angle, on steering wheel angular velocity and on steering torque;

(2) another embodiment provides a way in which the effect or influence of deflection across a torque sensor on steering wheel angle can be compensated for;

(3) yet another embodiment provides a solution for the compensation of an unbalanced weight of the steering wheel; and (4) a further embodiment provides another solution for the compensation of an unbalanced weight of the steering column and/or steering wheel.

It will be understood upon reading the foregoing that other approximations for compensating for these and other errors may be utilised to refine the steering in an EPAS system 10. Additionally it will be understood that these compensations may be used alternatively to one another or if applicable, in any combination with one another.

In the illustrations accompanying the description, like features have where applicable been denoted by like reference numerals.

In one described embodiment of the invention, an EPAS system 10 for a vehicle is described, in which an EPAS controller 32 is configured to control the amount of assistive torque supplied by an electric motor 22 of the EPAS system 10 based upon factors including the phasing caused by one or more joints positioned between mechanically linked components of the steering mechanism that are disposed at a non-linear angle (i.e. not 180°). The phase difference or shift in angle imparted by the joint(s) between mechanically linked components can cause undesired non-linearity in the steering feel. This is because the steering angle (and other variables) as measured by the EPAS system 10 sensors is different from the actual steering wheel angle α. (This is unless the steering angle measurement $\alpha_4$ is conducted by the EPAS system 10 directly at the steering wheel 12 such that the actual steering wheel angle α and the measured steering wheel angle $\alpha_4$ are exactly the same.)

In known EPAS systems, where a direct measurement of the angle of rotation of the steering wheel $\alpha_4$ is not taken at the steering wheel 12, the joints 18 in the steering column, between the steering wheel 12 and a point of measurement, affect (in other words influence) the accuracy of the measurement of steering wheel angle $\alpha_1$, $\alpha_2$, $\alpha_3$. Similarly; the steering wheel angular velocity and steering wheel torque measured by the EPAS system 10 may be inaccurate due to the phase difference of one or more joints 18 between mechanically linked components within the steering mechanism. These errors within the EPAS system 10 can have an undesirable effect on the steering feel. In this first embodiment of the invention, these errors are at least mitigated or corrected for. This embodiment of EPAS system 10 utilises a series of mathematical functions so that the EPAS controller 32 can correct, adjust or otherwise compensate for any phasing between the actual and the measured values of the variables: steering wheel angle, steering angle velocity and/or steering torque.

Figure 2:
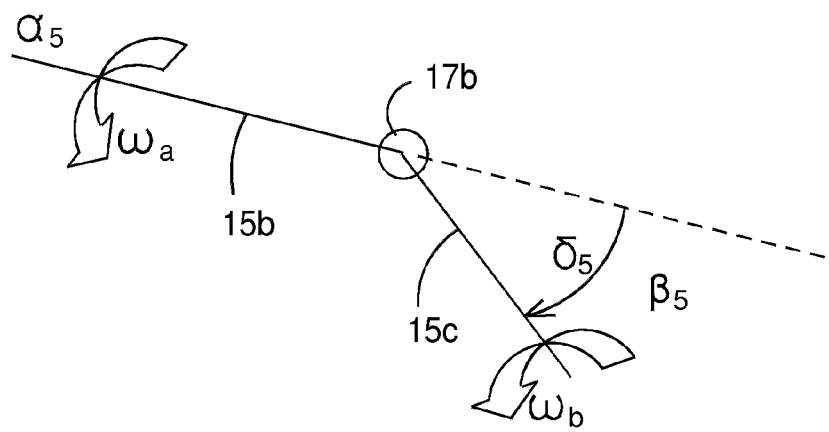
FIG. 2. is a schematic illustration of a pair of jointed shafts that may be comprised in the vehicle system of FIG. 1.

Referring now to FIG. 1, it has been identified that the actual steering wheel angle α in a vehicle does not necessarily match the shaft angle $\alpha_3$ where the measurement of steering wheel angle may be conducted. This is due, at least in part to the geometry of the non-linear linkage of components 15a, 15b, 15c, 17a, 17b. Considering a single joint 17a (see FIG. 2), where two shafts 15b, 15c are disposed at an angle $\delta_5$ ($\delta_5$ may be computed as π (rad) minus the angle between the shafts 15a, 15b), wherein the angle of rotation input at the first shaft 15b is $\alpha_5$ and the angle of rotation of the output shaft 15c is $\beta_5$ and wherein $\omega_a$ and $\omega_b$ are the angular velocities (in rad/s) of the two shafts 15a, 15b having angles $\alpha_5$ and $\beta_5$ respectively. The following relations hold between the angle at its input ($\alpha_5$ in FIG. 2) and the angle at its output ($\beta_5$ in FIG. 2).

$$\frac{\dot{\beta}_5}{\dot{\alpha}_5} = \frac{\omega_b}{\omega_a} = \frac{\cos\delta_5}{1 - \sin^2\delta_5 \cos^2\alpha_5}$$

First relationship between input and output angles, $\alpha_5$, $\delta_5$ and $\beta_5$.

$$\beta_5 = \arctan 2(\sin\alpha_5, \cos\alpha_5 \cdot \cos\delta_5)$$

Second relationship between input and output angles, $\alpha_5$, $\beta_5$ and $\delta_5$.

$$\alpha_5 = \arctan 2\left(\sin\beta_5, \frac{\cos\beta_5}{\cos\delta_5}\right)$$

Third relationship between input and output angles, $\alpha_5$, $\beta_5$ and $\delta_5$.

The first, second and third relationships can be used to compute, optionally in advance and optionally off-line, an improved or corrected value (in radians) of an input angle $\alpha_5$ from a measured value of angle $\beta_5$ (an output angle). The values can be stored in a look-up table referred to by the EPAS controller 32 and interpolated, if necessary, against steering wheel angle in real-time to calibrate the measured steering wheel angle and/or the steering wheel angular velocity and/or the steering wheel torque to thereby improve the accuracy of the measured or detected variable value of steering wheel angle, steering wheel angular velocity, or steering torque such that it is at least closer to if not the same as the actual steering wheel angle, steering wheel angular velocity or steering torque. As such the above relationships may not specifically be used by the processor or controller of an EPAS system, but values output from these or similar but optionally more approximate calculations may be provided in a reference table.

The measured steering wheel angle (for example $\alpha_3$ in FIG. 1) which may be received, as a data signal, by the EPAS controller unit 32, can be corrected or adjusted by the EPAS controller 32 to compensate for the phase difference imparted by one or all of the non-linear linkages for example joints 15a, 17a, 15b, 17b, 15c that are situated between the location at which the steering wheel angle is measured or detected (for example $\alpha_3$) and the steering wheel 12 itself. This correction may be done by applying the first, second and/or third relationships listed above for one or all of the joints 17a, 17b situated between the steering wheel 12 and the measured or detected steering wheel angle ($\alpha_3$) as follows:

CorrectedAngle=function(OriginalAngle)

($\alpha_3$'=function ($\alpha_3$))
($\alpha_3$=detected value of steering wheel angle, $\alpha_3$'=the improved value which is closer to the actual steering wheel angle α)

This embodiment of the invention provides an EPAS system 10 that uses more accurate values or improved values of the angle of rotation of the steering wheel 12. The more accurate data signal or variable values, when used by the EPAS controller unit 32, in real-time, in carrying out its computations to determine the amount of assistive torque (and any other computations it may be used in) to be supplied by the electric motor 22, may influence or affect the steering feel and result in an improved driving experience.

An optional aspect of this embodiment of the invention is the correction of steering wheel angular velocity. The measured steering wheel angular velocity parameter is corrected using the same relationships above:

CorrectedSteeringVelocity=function(MeasuredSteeringVelocity)

Yet a further optional aspect of this embodiment of the invention that is advantageously, but not essentially, used in combination with the afore-described corrections of steering wheel angle and steering wheel angular velocity is the correction of the actual torque applied by the driver ($T_4$) and the determined torque (T), as measured by the torque sensor 20. The torque sensor determined torque (T) can be corrected, adjusted or at least made more accurate to account for some or all of the discrepancy between the actual ($T_4$) and determined torque (T) values arising from fixed angular off-set, stiffness and/or free play. This can be done using the same approach used for the steering wheel angle and preferably, albeit optionally, in conjunction with the correction of steering wheel angle and/or steering wheel angular velocity. As such, one or all of the first, second and third relationships above can be applied in respect of all of the joints between the steering wheel 12 and the sensor 20 which measures the steering torque (T).

Corrected Torque=function(OriginalTorque)

It will be understood from the foregoing that the compensation for the presence of one or more joints 18 that imparts an angular phasing of a variable (such as steering wheel angle, steering wheel angular velocity or steering wheel torque) can be carried out in a number of ways. An example of an analytical approach to compensating for the effect of the phasing caused by one joint has been described, however, it is envisaged that many and various other ways for approximating or determining the effect of the joints phasing and correcting for the same will be suitable for carrying out the invention. For example, any of the trigonometric functions mentioned in the above equations may be approximated by a fixed value or a series expansion may be used to compute the value (such as a Taylor or Euler Series Expansion); further optionally, predefined values for each or any term in the above relationships may be listed in a look-up table (if appropriate) to be referenced during the computation of a more accurate input variable from the detected or measured variable. Additionally, or alternatively, or in combination, any of the trigonometric functions may be substituted by a fixed value or referenced look-up value or by an alternative approximation in order to simplify the computation (and thereby optionally reduce the processing time needed in order to compute the compensation). It is envisaged that each, any or all of the trigonometric functions listed in the above equations may be computed by using an expansion series such as a Taylor Expansion Series or if appropriate an Euler Expansion Series and/or predetermined and listed in a reference or look-up table. The values, if provided in a look-up table may be linearly interpolated, quadratically interpolated, exponentially interpolated or interpolated using any other suitable mathematical method that would provide a suitable approximate value for the trigonometric function value falling between two listed values.

Furthermore it will be understood that the order in which certain terms are computed may be adjusted in other embodiments of the invention and that a combination of calculation and/or referencing and/or approximation may be used for any or all of the relationships adopted to improve the accuracy of the detected variable.

Another embodiment of the invention is now described in which a compensation of the influence or effect of the steering wheel torque sensor 20, (which typically comprises a torsion bar, in an in-line measurement, but may, in alternative embodiments be a reactive torque sensor which causes drag) is made. This compensation of the angle of the torsion bar of the torque sensor 20 may be required because the torque sensor input angle $\alpha_3$ and the torque sensor output angle $\alpha 2$ (see FIG. 1) do not necessarily match. This mis-match, phase difference or error between torque sensor input angle $\alpha_3$ and the torque sensor output angle $\alpha_2$ is considered to be due to the deflection across the torsion sensor 20 due to the low-stiffness of the torsion sensor (20) (torsion bar) in the in-line torque sensor 20. A torque T in the torque sensor 20 causes a displacement $\Delta\alpha$.

The steering angle measured by the EPAS system 10 may therefore be different from the actual steering wheel angle $\alpha$. (This is unless the steering wheel angle is measured before the position of the torque sensor 20. If the steering wheel angle is measured directly at the steering wheel $\alpha_4$ or further in the steering mechanism downstream of the steering wheel, for example at optional sensor location $\alpha_3$, but before (upstream of) the position of the torque sensor 20, then the measurement of steering wheel angle is not changed by the torque sensor 20.)

If the steering wheel angle of the EPAS system 10 is measured at or after the position of the torque sensor 20 (e.g. at location of sensor $\alpha_2$), then the value of steering wheel angle received by the EPAS controller unit 32 can be corrected by the EPAS controller unit 32, to compensate for any inaccuracy imparted by the torque sensor 20 (for example when the torque sensor 20 is a torsion bar, the displacement $\Delta\alpha$), to obtain a more accurate value of the actual steering wheel angle parameter $\alpha$.

The angular displacement $\Delta\alpha$ across the torque sensor 20 is usually a known signal of an EPAS system 10, (this is because it is used to compute the torque T itself, optionally, by the following equation: $T=\Delta\alpha \times S$, where S is the known stiffness of the torsion bar). The angle measured at or after the position of the torque sensor 20 can therefore be corrected using:

CorrectedAngle=OriginalAngle+f($\Delta\alpha$),

Wherein f($\Delta\alpha$) provides for a compensation and may be $-\Delta\alpha$ such that the deflection across the torsion bar 20 is subtracted from the measured steering angle. In other envisaged embodiments f($\Delta\alpha$)=c. $\Delta\alpha$ such that the measured steering angle is off-set by a factor at least proportional to the displacement angle ($\Delta\alpha$).

In another embodiment of the invention, an EPAS system 10 for a vehicle is described, in which an EPAS controller 32 is configured to control the amount of assistive torque $T_1$ supplied by an electric motor 22 of the EPAS system 10 based upon factors including consideration of a weight imbalance present in the steering wheel.

In order to be compensated for, a torque contribution (Tweight) resulting from one or more offset weights 44 needs to be determined, optionally as a function of the steering wheel angle $\alpha$. This, is because the amount of constructive or destructive torque resulting from the presence of one or more off-set non centre masses 44 in the steering wheel 12 (and not resulting from the driver applied torque $T_4$) changes with the angle of rotation $\alpha$ of the steering wheel 12. In one embodiment, torque contribution (Tweight) is determined by an analytical approach. Optionally, a computation of torque contribution due to off-set, mass(es) 44 is carried out substantially continuously in real-time so that the EPAS system 10 is substantially continuously capable of compensating for the torque contribution due to off-set mass(es) 44.

Figure 3A:
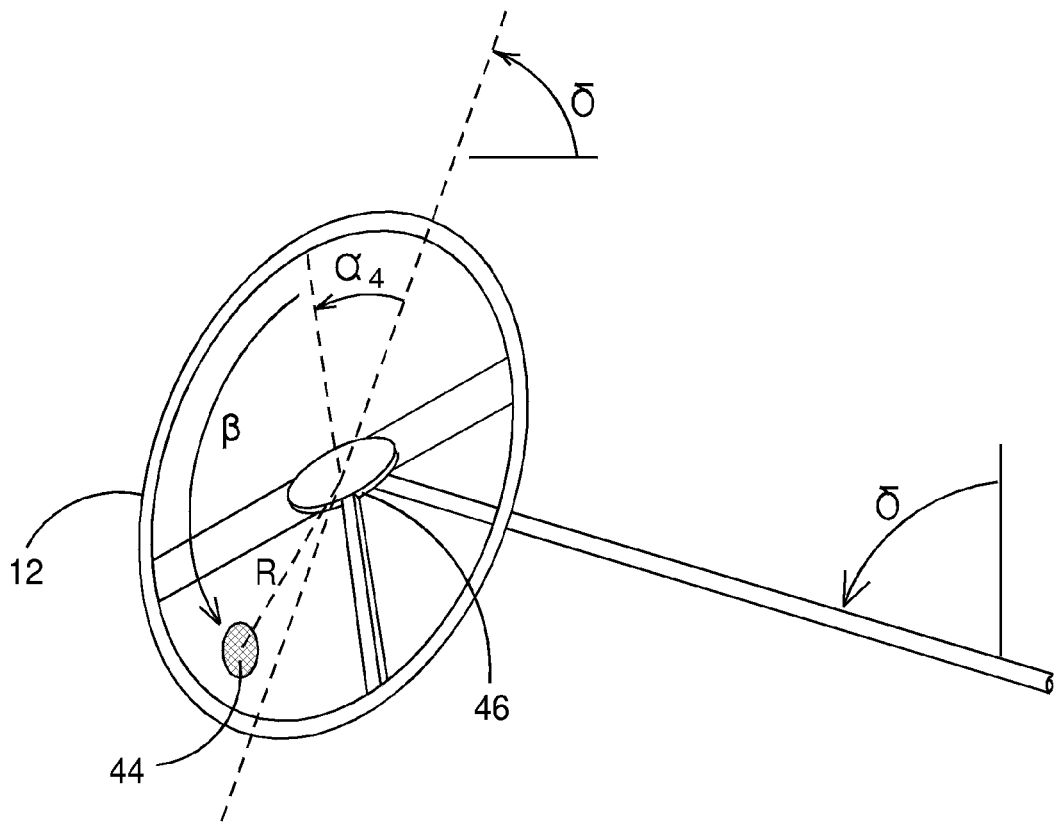
FIG. 3A. is a perspective view, schematically illustrating a steering wheel having an off-centre mass.
Figure 3B:
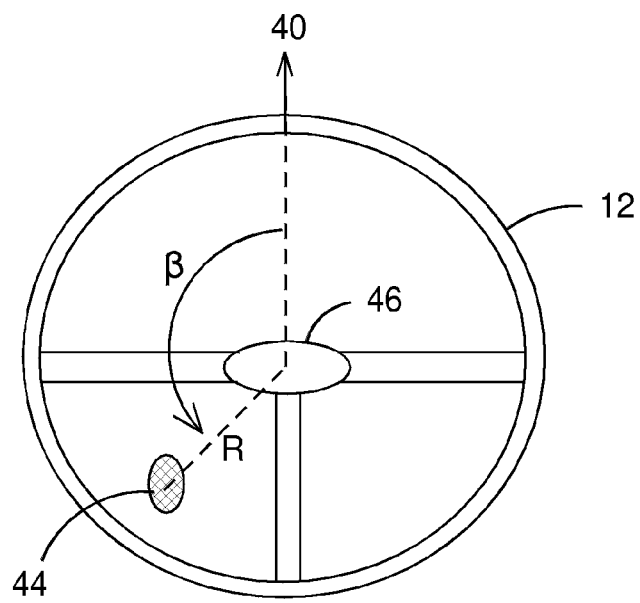
FIG. 3B. is an end view schematically illustrating the steering wheel of FIG. 3A in its centre non-rotated or "zero" position.

The weight imbalance may be taken to be entirely due to the weight 44 in the steering wheel 12 and the torque contribution to any weight imbalance resulting from the steering column is optionally ignored in this further embodiment. Additionally, the distributed weight is optionally treated as one or more point masses 44 (optionally measured in kilograms (kg)), placed at a distance R (measured in meters (m)) from the centre 46 of the steering wheel 12, at an angle of β (measured in radians (rad) from the straight ahead or dead centre position 40, which may be considered as when α=0). In FIGS. 3A and 3B schematic illustrations of a steering wheel 12 are provided in which a point mass 44 is shown at a position β radians from the straight ahead position or "zero point" 40 and at a distance R from the centre 46 of the steering wheel 12. When the steering wheel 12 is rotated away from the "zero point" 40 (see FIG. 3C) to an actual steering wheel angle of α (rad), the mass 44 is at an overall angle γ which is calculated as follows:

$$\gamma = (\alpha + \beta) [\text{in radians}]$$

The steering wheel 12 of a vehicle is typically positioned at an inclined angle within the vehicle for ergonomic performance and enhanced driver comfort. The steering wheel 12 may therefore rotate in a plane placed at an angle δ from a horizontal plane. The torque contribution (Tweight) due to the off-set mass 44 may therefore be computed as:

$$T\text{weight}[\text{Nm}] = W[\text{kg}] \cdot g[\text{m/s}^2] \cdot R[\text{m}] \cdot \sin(\gamma) \cdot \sin(\delta)$$

Wherein the factor g accounts for acceleration due to gravity which may be taken to be about 9.81 m/s². In other embodiments a more approximate computation of the torque contribution (Tweight) may be carried out and the factor (g) to account for acceleration due to gravity may optionally be taken to be between about 9 and about 10 m/s².

(In the above equation '·' is used as the standard symbol for multiplication and can be read as equivalent to the often used multiplication symbol '×').

The values W, g, R, β are all constants, vehicle dependent and known in advance. Therefore, these values can be provided to the EPAS controller 32 for carrying out the torque contribution (Tweight) calculation for a vehicle. These values may be approximated or rounded to facilitate the EPAS controller's computation. Furthermore, the computation of torque contribution (Tweight) may be carried out in any mathematically suitable order and not necessarily as a single calculation as written above.

δ may be a constant value (hence known), or may vary within a specified range (for example, in vehicles having height-adjustable or rake-adjustable steering columns). In the latter case, in some embodiments, the value of δ may be available (through measurement or by knowing which position, of a limited set of position selections, the steering wheel 12 has been put into). However, if the value of δ is variable and cannot be determined, a default value for δ may be used (for example the intermediate value between the minimum and maximum steering wheel 12 adjustment positions). Alternatively the computation of torque contribution (Tweight) may, in some embodiments exclude the term sin (δ) or may include the term, but set δ equal to π/2 radians in order for the term sin(δ) to equal 1 and thereby render it a mute term in order to simplify the computation. A detected value of steering wheel angle $\alpha_1$, $\alpha_2$, $\alpha_3$, $\alpha_4$ (from which γ can be derived) is provided to the EPAS controller unit 32 as one or more data signals from a direct sensor disposed at the steering wheel 12 and/or from one or more indirect sensors 34 or other measurement means, in real time.

For every value of the steering wheel angle α, the torque to be compensated for can therefore be computed. The real-time calculation of torque contribution (Tweight) is a signal usable by the EPAS controller 32 in calculating the assistance torque $T_1$ that should be applied to the rack 14 by the electric motor 22.

Figure 3C:
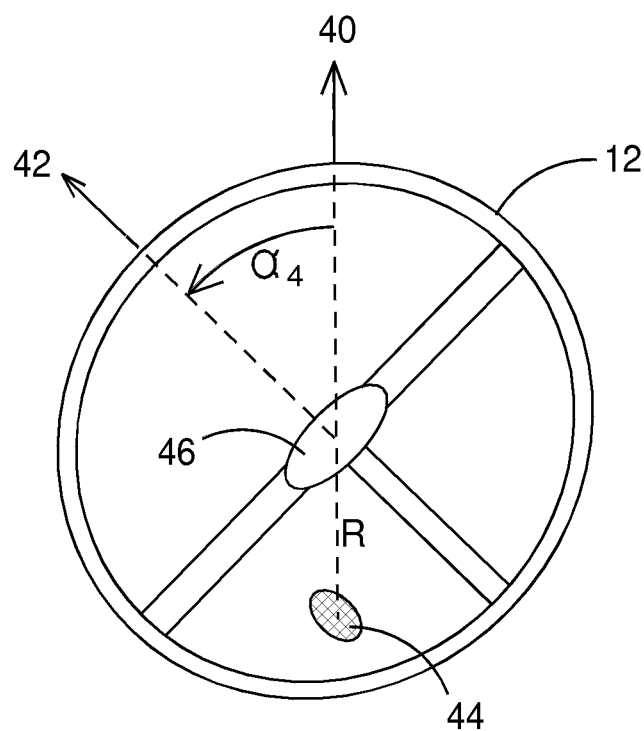
FIG. 3C. is an end view schematically illustrating the steering wheel of FIG. 3A in an anti-clockwise rotated position, having been moved α4 radians away from the "zero" position.
Figure 3D:
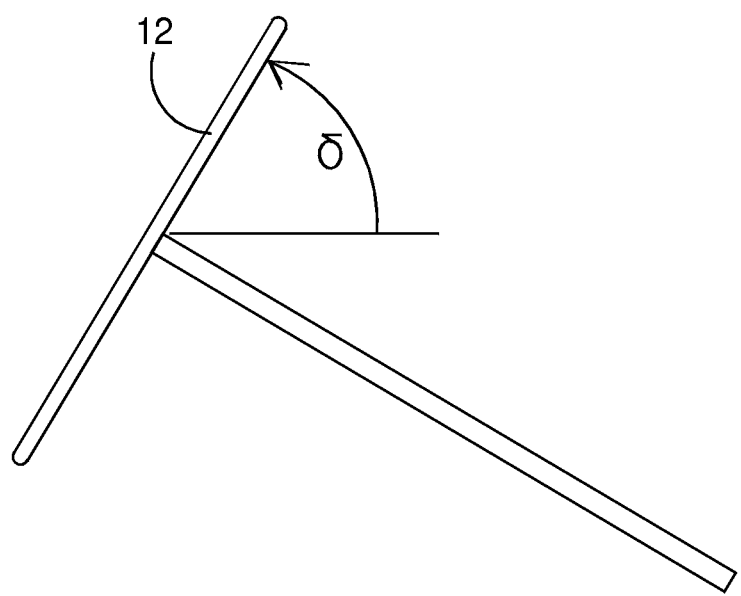
FIG. 3D. is a side view schematically illustrating the steering wheel of FIG. 3A.

As the steering wheel 12 is turned (as shown in FIG. 3C) the point mass 44 provides a positive additional contribution to the torque applied by the driver. In this instance the calculated torque contribution (Tweight) is a component of the measured driver applied torque $T_4$ that is false and can be compensated for by subtracting the torque contribution (Tweight) from the measured driver applied torque $T_4$. The false component of the measured driver applied torque $T_4$ can be compensated for by providing less assistive torque than would otherwise be provided by the EPAS system 10.

Conversely, if the driver rotates the steering wheel 12 such that he has to lift the mass 44, the presence of the offset weight 44 imparts a torque (Tweight) that opposes and acts against the torque applied by the driver. (In the illustrated example of FIG. 3B this could be a clockwise rotation to the right from the straight ahead position 40). The weight W of mass 44 provides a negative additional contribution to the torque $T_4$ applied by the driver. In this instance the calculated torque contribution (Tweight) has a negative value and by subtracting this false torque contribution (Tweight) from the measured driver torque, the actual driver torque that should be used for the purpose of calculating the amount of assistive torque to apply is increased.

It will be understood from the foregoing that the compensation for the presence of a weight imbalance present in the steering wheel 12 can be carried out in a number of ways. One example of an analytical approach to compensating for the effect of one weight imbalance in a steering wheel has been described, however, it is envisaged that many and various other ways for approximating or determining the effect of the weight imbalance and correcting for the same will be suitable for carrying out the invention. Furthermore, the aforedescribed approach may be varied in accordance with the teaching of the present invention. For example, it is envisaged that more than one point mass(es) 44, at different locations on or within the steering wheel 12 could be included (to compensate for say an air bag at one location and a control or switch-pack for an infotainment device located at another).

Figure 5:
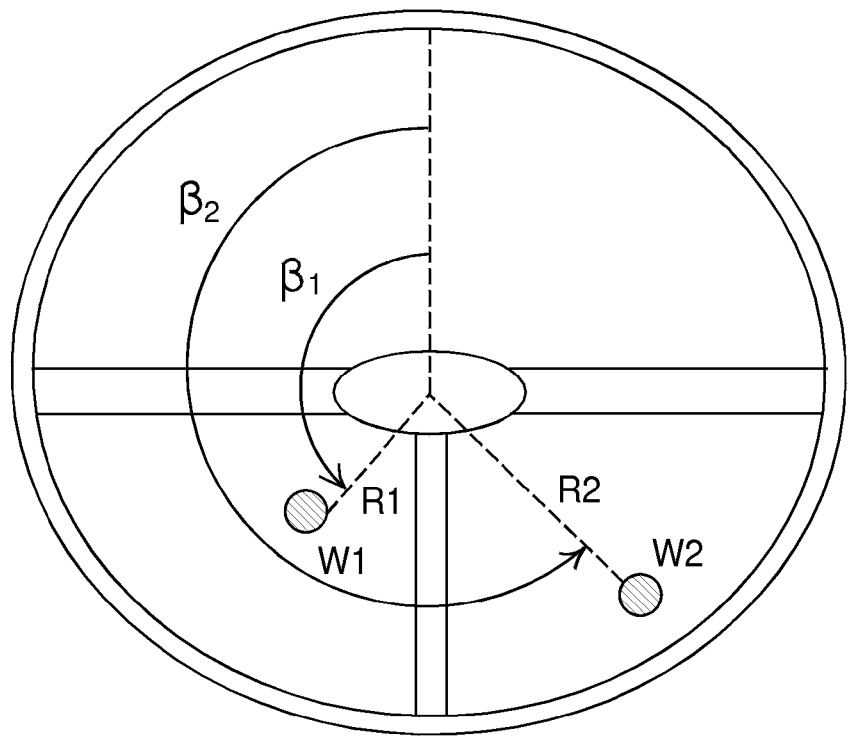
FIG. 5. is an end view, schematically illustrating a steering wheel having more than one off-centre mass.

Furthermore, whereas the mass 44 has been treated as a single point mass 44 at a position R from the centre, a computation to compensate for the effects of one or more equivalent distributed offset masses in a steering wheel 12 could be carried out. Similarly, if there is more than one "single-point" mass to be compensated for, they can be included in the torque contribution (Tweight) computation. FIG. 5 illustrates a steering wheel 112 having two off-centre masses each treated as a separate single point mass $W_1$, $W_2$, at a radius from the centre of $R_1$, $R_2$ respectively and at an angle $\beta_1$, $\beta_2$ from the "zero" or straight ahead position. Compensating for more than one mass or a distributed rather than single point mass may optionally be done by computing a torque contribution (Tweight) for each mass and summing the total torque contribution (Tweight) or alternatively or in combination, an overall calculation of the torque contribution (Tweight), may include, as an input variable, a Mass Position Product term (as set out below). A Mass Position Product input may optionally be incorporated into the computation of torque contribution (Tweight) or may be pre-calculated and optionally available as an input to that calculation. A Mass Position Product term may be defined as follows:

$$MassPositionProduct = \sum_{i=1}^{n} W_i \cdot R_i \cdot \sin(\alpha + \beta_i)$$

Wherein $W_i$ is the mass at position i, $R_i$ is the radial distance of mass i from the steering wheel centre and $\beta_i$ is the angular offset from the "zero" or straight ahead position of that mass i. The sum is carried out for each mass i to n comprised in the steering wheel or being compensated for.

It will also be understood that including the angle of incline $\delta$ of the steering wheel in a computation of the torque contribution (Tweight) is entirely optional and in some envisaged embodiments, the torque contribution (Tweight) computation will not include this; in other embodiments a fixed parameter may be used instead of $\sin(\delta)$ in order to make the computation of torque contribution (Tweight) easier to compute by the control unit processor 32 of the EPAS system. This may give a more approximate value, but nevertheless the variable torque contribution (Tweight) computed could still be used to correct or improve the accuracy of the measured steering wheel torque and would still vary based upon steering wheel angle.

It will also be understood that alone, or in combination with the above mentioned approximations, that the calculation of $\sin(\gamma)$ may be done in a number of ways in order to simplify the computation and thereby reduce the processing time needed in order to compute torque contribution (Tweight). Specifically it is envisaged that $\sin(\gamma)$ may be computed by using an expansion series such as a Taylor expansion series; or that $\sin(\gamma)$ may be provided in a look up table which the EPAS controller unit 32 would refer to in order to compute a value of torque contribution (Tweight). Such a look-up table would likely comprise a series of values for $\sin(\gamma)$ at discrete given steering wheel angles ($\alpha$) because $\beta$, the angle or position of a mass, could be determined and programmed into the EPAS systems. The values of $\sin(\gamma)$ provided in the look-up table may be linearly interpolated, quadratically interpolated, exponentially interpolated or interpolated using any other suitable mathematical method that would provide a suitable approximate value for $\sin(\gamma)$ that would be appropriate to use in the computation of torque contribution (Tweight) for a detected or derived value of steering wheel angle $\alpha$ not listed in the look-up table but falling between values of detected or derived value of steering wheel angle $\alpha$ that are listed.

Furthermore, it will be understood that whereas the initial calculation of torque contribution (Tweight) incorporates a value of gravity g for converting the mass 44 into a weight, the value of g used in the computation may be approximated to any suitable degree of accuracy. It is expected that a value of 10 may be used in some embodiments, and it is envisaged that any value from about 9 to about 10 would be suitable. In other embodiments, the conversion of the mass 44 into a weight W may be done outside of the computation of torque contribution (Tweight) and the weight W inserted as a variable input into the computation of Tweight. Alternatively, a variable of Weight Position Product (WPP) may be input into the computation of Torque contribution (Tweight) for only one mass. In other embodiments, the factor g for converting from mass 44 to weight may be included in the calculation of the mass position product as follows (wherein g may be any suitable fixed value such as 10, 9.8 and others.)

$$WeightPositionProduct(WPP) = g \cdot \sum_{i=1}^{n} W_i \cdot R_i \cdot \sin(\alpha + \beta_i)$$

The preceding paragraphs describe manners in which the computation of torque contribution (Tweight) may be simplified or approximated in order to accommodate processing of the computation by the EPAS controller 32. Various ways of simplification and approximation may be carried out and the above description provides only examples as to how an algorithm may be constructed, there being many and various ways that one skilled in the art, upon reading the foregoing, would understand as suitable for computing a value of torque contribution (Tweight) to be used to compensate for one or more weight imbalances in a steering wheel 12.

In earlier described embodiments, it is explained how the EPAS controller 32 of the system described herein is configured to improve upon the accuracy of one or more detected values of the steering wheel angle $\alpha$. Any of the originally detected values or improved values of steering wheel angle can be used for the purposes of calculating or computing an approximation of torque contribution (Tweight). Whereas it is expected that using an improved value of steering wheel angle in the computation or look-up table of torque contribution (Tweight) may produce a more accurate result, it is not a necessary feature of the invention that the improved value of steering wheel angle $\alpha'$ must be used, but rather any one of the measured steering wheel values $\alpha_1$, $\alpha_2$, $\alpha_3$, $\alpha_4$ could be used, it being understood that using an improved steering wheel angle $\alpha$; value may further improve upon the compensation being carried out for steering wheel torque due to a weight imbalance.

Another method for determining a Torque contribution (Tweight) signal is now described.

In yet another embodiment of the invention, an EPAS system 10 for a vehicle is described, in which an EPAS controller 32 is configured to control the amount of assistive torque supplied by an electric motor of the EPAS system 10 based upon factors including consideration of both a weight imbalance present in the steering wheel and optionally any weight imbalance present in the steering mechanism.

The torque contribution (Tweight) may be determined by measuring the static, "hands-off" torque T detected by the torque sensor 20. For example, this measurement is advantageously taken for several values of the actual steering wheel angle $\alpha$, for example, from about 0 to about $2\pi$ (rad), and storing those values in a look-up table. The stored values can be interpolated in real time against steering wheel angle $\alpha$. Optionally the interpolation may be linear, however other suitable interpolation methods may be used for example, a quadratic or other polynomial interpolation, an exponential interpolation or any other suitable mathematical interpolation method may be used. The following table provides an example of a look-up table that may be produced and programmed into the EPAS system 10 for its reference.

| $\alpha$ | 0 | $\pi/8$ | $2\pi/8$ | ... |
|---|---|---|---|---|
| Torque (Tweight) | $T_1$ [Nm] | $T_2$ [Nm] | $T_3$ [Nm] | ... |

For every measured value of the steering wheel angle $\alpha$, the torque contribution (Tweight) to be compensated for is determined. The measurements can be carried out during a calibration process during vehicle production. Additionally, the values in the look-up table can be updated periodically during the vehicles lifetime, for example during servicing.

The torque values advantageously should be measured under static conditions (otherwise the value will be affected by the acceleration and inertia of the steering wheel), and with "hands-off" the steering wheel (otherwise the value will be affected by the torque applied by the driver). To measure the torque at different angles, it is sufficient (for example) to rotate the steering wheel 12 to a particular angle α, and record the value of the torque as measured by the torque sensor 20 at that angle α. Any value different to zero can be attributed to an imbalanced weight (unless there is some stiction in the system, that could hold the sensor twisted, in which case multiple measurements may be needed to average out the error).

Preferably, the steering wheel angle used for the look-up table should be the most accurate measurement that is available, for example, the steering wheel angle used in the measurement of torque contribution (Tweight) may be one that has been improved by the compensations to be described below. However, it will be understood that a less accurate steering wheel angle value may be used during the measurement of torque contribution (Tweight), (for example, $α_1$ or $α_2$) and the resulting approximation of torque contribution (Tweight) for that steering wheel angle may still provide a useful set of values of the torque contribution (Tweight) that can improve the accuracy of the EPAS system 10. Optionally, but not exclusively, the same source of steering wheel angle measurement used in determining an approximation for the torque contribution (Tweight) is used when referencing the look-up table containing the stored values of torque contribution (Tweight).

The measured determination of torque contribution (Tweight) is advantageous because it does not require knowledge of the mechanical parameters of the vehicle. It can also be used to compensate for weights that are not only present on the steering wheel 12, but also for weight imbalances that are present in the steering column. The measurement method can also be used to compensate for distributed rather than point weights within the steering wheel 12 and steering column (if applicable) and for more than one weight (distributed or lumped). In many steering wheels 12 control devices for audio and communications equipment are disposed within the steering wheel 12; the steering wheel 12 itself is often made of different density materials; and the air bag is not strictly a point weight. As such the weight imbalance is more likely to be a set of distributed weights and not a single point weight. Whereas the calculation approach provides a good and useful approximation of the torque contribution (Tweight) that should be compensated for, the measurement method of the present embodiment may be more accurate.

However, the measurement method may be more sensitive to stiction (the stiction in the system may directly affect the torque measurements). However, the effect of stiction can at least be partly eliminated with repeated measurement. Whereas the look-up table above contains three measurements of torque contribution (Tweight) at three angles, it will be understood that many measurements may be made and made at a desired angle resolution. In other envisaged embodiments, the resolution of measurement of torque contribution (Tweight) may or may not be uniform (in other words, torque contribution (Tweight) may be measured at every π/8 radians for example, or torque contribution (Tweight) may be measured at higher resolution intervals within a selected range of steering wheel angle from the straight ahead position, but at lower resolution intervals (ie larger intervals) outside the selected range of steering wheel angle and the resolution may change the further away from the straight ahead or zero position the steering wheel is turned. (This may give greater compensation sensitivity across the most commonly used steering wheel angle range and a lower degree of sensitivity outside of this range, which may yield faster computation).

Alternatively, in some embodiments, at angles outside of a "compensation range", torque contribution (Tweight) may not be computed, measured or if computed or measured may not be used in a compensation computation. It should also be noted that an EPAS system 10 including a mechanism according to the present invention for computing and/or measuring torque contribution (Tweight) that is capable of compensating for Tweight, may additionally be programmed to exclude torque contribution (Tweight) compensation in certain circumstances.

It is envisaged that in other embodiments of EPAS system 10 according to the invention, a combination of analysis of torque contribution (Tweight) and measurement of torque contribution (Tweight) may be carried out in order to result at an averaged or combined torque contribution (Tweight) value. Furthermore, it is envisaged that other analytical approximations and measurement techniques may be deployed to provide a value of torque contribution (Tweight) that can be used for its compensation and the specific calculation and measurement methods described herein represent only optional ways of compensating for or cancelling out undesirable effects of weight imbalances.

Whichever methods are used to calculate a value of torque contribution (Tweight) for a given steering wheel angle α, once a measurement of torque contribution (Tweight) as a function of the steering wheel angle α is obtained it can be used to compensate for its effects.

As referred to above, if compensation is carried out at the Input of the EPAS system 10, torque contribution (Tweight) can be compensated for within the EPAS controller 32, by subtracting its value from the torque signal from the sensor:

$$\text{SensorTorqueCorrected} = \text{SensorTorque} - \text{Tweight}$$

Torque contribution (Tweight) can be compensated at the Output side within the EPAS controller, by subtracting from the motor torque demand $T_1$ a torque correction (dependent on steering wheel angle) such that it counteracts (e.g. is opposite to) the torque required to move the offset weight. This output side may be done alternatively to the input side correction or may be conducted in addition to the input side correction.

The ratio between torque at the electric motor 22 and torque at the steering wheel 12 is not 1, due to the gearing between the two (see gears $k_1$ and $k_2$ in FIG. 1), therefore the additional torque demand at the electric motor 22 side needs to be appropriately scaled by $k_1/k_2$ to obtain the correct compensation:

$$\text{MotorTorqueDemandCorrected} = \text{MotorTorqueDemand} - \text{Tweight} * k_1/k_2$$

In other vehicle arrangements the gear configuration may be different to that illustrated and a different scaling factor may therefore be required.

It will be understood that the various embodiments of the invention described can be implemented together, separately or in a variety of combinations to create an EPAS system that is beneficially more accurate in the assistive torque it applies.

The invention claimed is:

1. A vehicle comprising an electric power assist steering (EPAS) system having a controller unit, a steering wheel, an electric motor, and a rack coupled to and disposed between both the steering wheel and the electric motor, wherein the controller unit of the EPAS system is configured to receive a detected value of steering wheel angle and/or steering wheel angular velocity at a position between the steering wheel and the rack, and wherein the controller unit of the EPAS system is configured to improve the accuracy of the detected value of steering wheel angle and/or steering wheel angular velocity by compensating for an angular phasing of the joint between any two linked components of the steering mechanism by carrying out a computation to derive an improved value of steering wheel angle and/or steering wheel angular velocity from the detected value of steering wheel angle and/or steering wheel angular velocity, which computation accounts for an angle at a joint ($\delta_5$) between the two linked components that is located between the steering wheel and the position corresponding to the detected steering wheel angle value and/or the steering wheel angular velocity value, and wherein said compensation is carried out using any one or more of the following relationships:

$$\frac{\dot{\beta}_5}{\dot{\alpha}_5} = \frac{\omega_b}{\omega_a} = \frac{\cos\delta_5}{1 - \sin^2\delta_5 \cos^2\alpha_5};$$

$$\beta_5 = \arctan2(\sin\alpha_5, \cos\alpha_5 \cdot \cos\delta_5); \text{ and}$$

$$\alpha_5 = \arctan2\left(\sin\beta_5, \frac{\cos\beta_5}{\cos\delta_5}\right)$$

wherein the two linked components are disposed at the angle $\delta_5$ relative to one another, wherein the angle of rotation at the input is $\alpha_5$ and the angle of rotation at the output is $\beta_5$ and wherein $\omega_a$ and $\omega_b$ are the angular velocities (in rad/s) of the two linked components having angles of rotation of $\alpha_5$ and $\beta_5$ respectively.

2. A vehicle according to claim 1 wherein the EPAS system is configured to use the improved value of steering wheel angle and/or steering wheel angular velocity to compute the amount of assistive torque supplied by a motor of the EPAS system.

3. A vehicle according to claim 1 wherein a sensor for detecting the angle of rotation of the steering wheel is disposed within the steering mechanism and is not directly connected to the steering wheel.

4. A vehicle according to claim 1, wherein the EPAS system is configured to compensate for the effect of angle phasing of the joint between two linked components of the steering mechanism using a computation that includes an approximation and/or equivalent function or value for any one or more of:
  the cosine and/or sine of the angle between the two linked components (cos $\delta_5$ and/or sin $\delta_5$);
  (ii) the square of the cosine of the angle input to the joint ($\cos^2 \alpha_5$);
  (iii) the square of the sine of the angle between the two linked components ($\sin^2 \delta_5$);
  (iv) the cosine and/or sine of the angle input to the joint (cos $\alpha_5$ and/or sin $\alpha_5$);
  (v) the arctangent in the range of $-\pi/2$ and $\pi/2$ of the sine of the angle input to the joint and of the cosine of the angle between the two linked components multiplied by the cosine of the angle input to the joint; and
  (vi) the arctangent in the range of $-\pi/2$ and $\pi/2$ of the sine of the angle output from the joint (sin $\beta_5$) and of the quotient of the cosine of the angle output from the joint and the cosine of the angle between the two linked components (cos $\beta_5$/cos $\delta_5$).

5. A vehicle according to claim 4 wherein the computation that includes an approximation and/or equivalent function or value uses a Taylor Series expansion or a Euler Series Expansion and/or references an approximate or equivalent value from a look-up table.

6. A vehicle according to claim 5 wherein the EPAS system is configured to compensate for the effect of angle phasing of a joint between two linked components of the steering mechanism to improve the accuracy of the steering wheel angle ($\alpha$) and/or the steering angle velocity by conducting a computation in which reference is made to one or more look-up tables to locate one or more stored values approximating said relationships between the detected variable and/or the angle(s) of the joint between the two linked components.

7. A vehicle according claim 1, wherein the EPAS system is configured to receive a detected value of steering wheel torque and is configured to improve the accuracy of the detected value of steering wheel torque by compensating for an angular phasing of a joint between any two linked components of the steering mechanism.

8. A vehicle comprising an electric power assist steering (EPAS) system having a controller unit, a steering wheel, an electric motor, and a rack coupled to and disposed between both the steering wheel and the electric motor, wherein the controller unit of the EPAS system is configured to receive a detected value of steering wheel angle and/or steering wheel angular velocity at a position between the steering wheel and the rack, and wherein the controller unit of the EPAS system is configured to improve the accuracy of the detected value of steering wheel angle and/or steering wheel angular velocity by compensating for an angular phasing of the joint between any two linked components of the steering mechanism and/or drive mechanism by carrying out a computation to derive an improved value of steering wheel angle and/or steering wheel angular velocity from the detected value of steering wheel angle and/or steering wheel angular velocity, which computation accounts for an angle at a joint ($\delta_5$) between the two linked components that is located between the steering wheel and the position corresponding to the detected steering wheel angle value and/or the steering wheel angular velocity value, and wherein the EPAS system is configured to use at least an approximation of a torque contribution (Tweight) to the steering wheel torque caused by the presence of one or more weights disposed in the steering wheel in an off-centre position to compensate for that torque contribution (Tweight) by computing a corrected value of steering wheel torque from a detected value of steering wheel torque and/or to compensate for that torque contribution (Tweight) by computing a corrected value of assistive motor torque.

9. An electric power assist steering (EPAS) system for a vehicle having a controller unit, a steering wheel, an electric motor, and a rack coupled to and disposed between both the steering wheel and electric motor, wherein the controller unit of the system is configured to receive a detected value of steering wheel angle and/or steering wheel angular velocity at a position between the steering wheel and the rack, and to improve the accuracy of the detected value of steering wheel angle and/or steering wheel angular velocity by compensating for an angular phasing of the joint between any two linked components of the steering mechanism by carrying out a computation which accounts for an angle at a joint ($\delta_5$) between the two linked components that is located between the steering wheel and the position corresponding to the detected steering wheel angle value and/or steering wheel angular velocity value, wherein said compensation is carried out using any one or more of the following relationships:

$$\frac{\dot{\beta}_5}{\dot{\alpha}_5} = \frac{\omega_b}{\omega_a} = \frac{\cos\delta_5}{1-\sin^2\delta_5\cos^2\alpha_5};$$

$$\beta_5 = \arctan2(\sin\alpha_5, \cos\alpha_5, \cos\delta_5); \text{ and}$$

$$\alpha_5 = \arctan2\left(\sin\beta_5, \frac{\cos\beta_5}{\cos\delta_5}\right)$$

wherein the two linked components are disposed at the angle $\delta_5$ relative to one another, wherein the angle of rotation at the input is $\alpha_5$ and the angle of rotation at the output is $\beta_5$ and wherein $\omega_a$ and $\omega_b$ are the angular velocities (in rad/s) of the two linked components having angles of rotation of $\alpha_5$ and $\beta_5$ respectively.

10. A method of assisting the steering of a vehicle, the method comprising:
    (a) providing an electric power assist steering (EPAS) system having a steering wheel and an electric motor both coupled to a rack wherein the rack is disposed between the steering wheel and the electric motor, and a controller configured to adjust a detected variable value used by the controller of the EPAS system;
    (b) receiving a detected value of steering wheel angle or steering wheel angular velocity at a position between the steering wheel and the rack of the EPAS system;
    (c) adjusting the detected value of steering wheel angle or steering wheel angular velocity by compensating for a phasing of a joint between any two linked components of a steering mechanism located between the steering wheel and the position corresponding to the detected steering wheel angle value or the steering wheel angular velocity value, said compensation being carried out using any one or more of the following relationships:

$$\frac{\dot{\beta}_5}{\dot{\alpha}_5} = \frac{\omega_b}{\omega_a} = \frac{\cos\delta_5}{1-\sin^2\delta_5\cos^2\alpha_5};$$

$$\beta_5 = \arctan2(\sin\alpha_5, \cos\alpha_5, \cos\delta_5); \text{ and}$$

$$\alpha_5 = \arctan2\left(\sin\beta_5, \frac{\cos\beta_5}{\cos\delta_5}\right)$$

wherein the two linked components are disposed at an angle $\delta_5$ relative to one another, wherein the angle of rotation at the input is $\alpha_5$ and the angle of rotation at the output is $\beta_5$ and wherein $\omega_a$ and $\omega_b$ are the angular velocities (in rad/s) of the two linked components having angles of rotation of $\alpha_5$ and $\beta_5$ respectively; and
    (d) using the adjusted value of steering wheel angle or steering wheel angular velocity in computations to calculate the amount of assistive torque to be supplied by a motor of the EPAS system.

11. A controller for use in an EPAS system of a vehicle having a steering wheel and an electric motor both coupled to a rack wherein the rack is disposed between the steering wheel and the electric motor, the controller including a program containing one or more algorithms such that when running, the program is configured to compensate for an inaccuracy in a detected steering wheel angle and/or detected steering wheel angular velocity, the program configured to receive a detected value of steering wheel angle and/or steering wheel angular velocity at a position between the steering wheel and the rack and configured to adjust the detected value to compensate for an angular phasing of a joint between any two linked components of the steering mechanism by carrying out a computation which accounts for an angle at a joint ($\delta_5$) between the two components and located between the steering wheel and the position corresponding to the detected steering wheel angle value and/or the steering wheel angular velocity value, wherein said compensation is carried out using any one or more of the following relationships:

$$\frac{\dot{\beta}_5}{\dot{\alpha}_5} = \frac{\omega_b}{\omega_a} = \frac{\cos\delta_5}{1-\sin^2\delta_5\cos^2\alpha_5};$$

$$\beta_5 = \arctan2(\sin\alpha_5, \cos\alpha_5, \cos\delta_5); \text{ and}$$

$$\alpha_5 = \arctan2\left(\sin\beta_5, \frac{\cos\beta_5}{\cos\delta_5}\right)$$

wherein the two linked components are disposed at the angle $\delta_5$ relative to one another, wherein the angle of rotation at the input is $\alpha_5$ and the angle of rotation at the output is $\beta_5$ and wherein $\omega_a$ and $\omega_b$ are the angular velocities (in rad/s) of the two linked components having angles of rotation of $\alpha_5$ and $\beta_5$ respectively.

12. A vehicle comprising an electric power assist steering (EPAS) system, wherein the EPAS system is configured to receive a detected value of steering wheel angle ($\alpha$) and/or steering wheel angular velocity and wherein the EPAS system is configured to improve the accuracy of the detected value of steering wheel angle and/or steering wheel angular velocity by compensating for an angular phasing of a joint between any two linked components of the steering mechanism by carrying out a computation to derive an improved value of steering wheel angle and/or steering wheel angular velocity from the detected value of steering wheel angle ($\alpha$) and/or steering wheel angular velocity, which computation accounts for an angle at a joint ($\delta_5$) between the two linked components, wherein said compensation is carried out using any one or more of the following relationships:

$$\frac{\dot{\beta}_5}{\dot{\alpha}_5} = \frac{\omega_b}{\omega_a} = \frac{\cos\delta_5}{1-\sin^2\delta_5\cos^2\alpha_5};$$

$$\beta_5 = \arctan2(\sin\alpha_5, \cos\alpha_5, \cos\delta_5); \text{ and}$$

$$\alpha_5 = \arctan2\left(\sin\beta_5, \frac{\cos\beta_5}{\cos\delta_5}\right)$$

wherein the two linked components are disposed at the angle $\delta_5$ relative to one another, wherein the angle of rotation at the input is $\alpha_5$ and the angle of rotation at the output is $\beta_5$ and wherein $\omega_a$ and $\omega_b$ are the angular velocities (in rad/s) of the two linked components having angles of rotation of $\alpha_5$ and $\beta_5$ respectively.

* * * * *